United States Patent Office 2,714,429
Patented Aug. 2, 1955

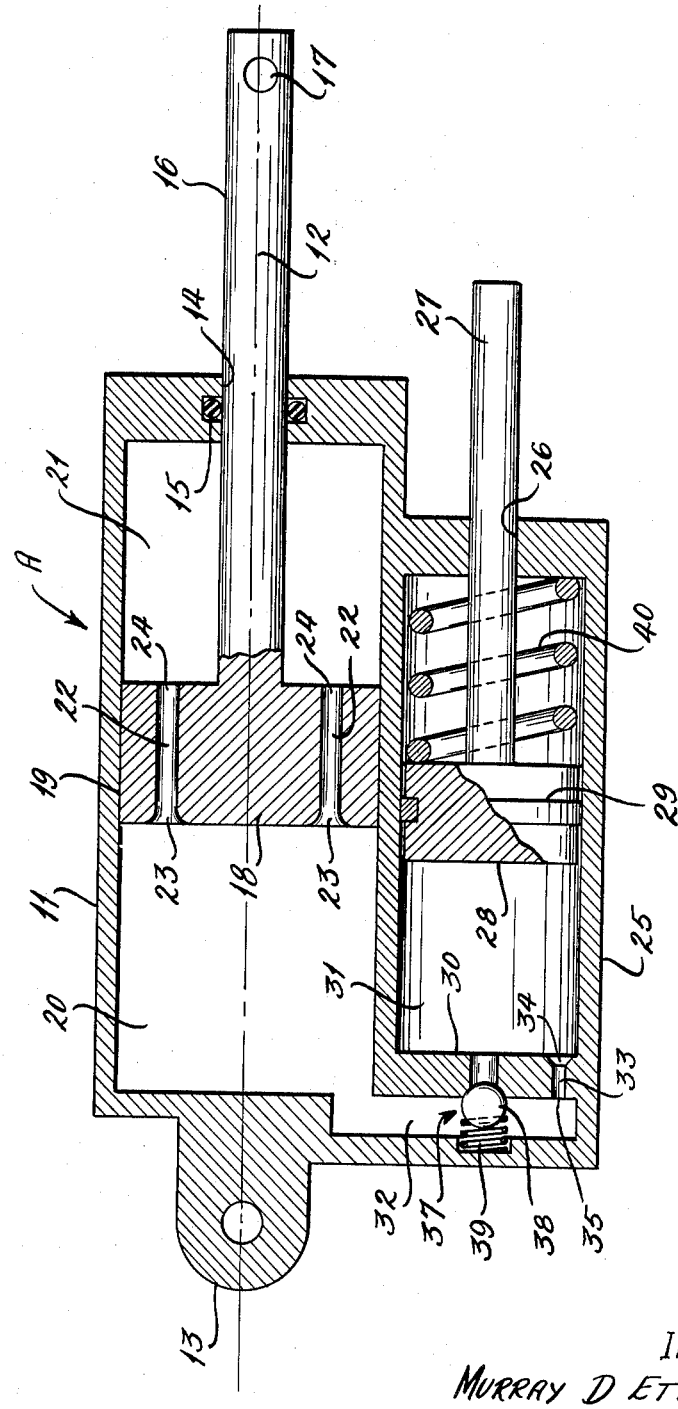

2,714,429

SHIMMY DAMPER FOR STEERABLE AIRCRAFT WHEEL

Murray D. Etherton, Kirkwood, Mo., assignor to McDonnell Aircraft Corporation, St. Louis, Mo., a corporation of Maryland Application June 22, 1951, Serial No. 233,068

3 Claims. (Cl. 188—96)

This invention relates primarily to dampers for controlling the oscillations of steerable nosewheels of tricycle-gear airplanes, and more particularly to shimmy dampers of the fluid-filled dashpot type.

Considerations of simplicity in construction and maintenance make advisable the utilization of nosewheel shimmy dampers of the type having a piston rod which protrudes from one end only of a dashpot cylinder. When such construction is utilized it is apparent that the side of the dashpot piston to which the piston rod is connected (herein called the "outer side") will present a smaller area than the opposite side thereof (herein called the "inner side"). As a result of this difference in area, on the inward stroke of the piston rod the unit pressure exerted on the dashpot fluid will be less for a given load than the unit pressure exerted for an equal load in an outward direction. The rate of flow of the fluid through orifices in the dashpot piston will vary as a function of the pressure so exerted. However, for efficient function as a shimmy damper, it is important that the flow through the piston orifices be equal under equal reverse loadings.

Another problem in the construction of shimmy dampers of the dashpot type is to avoid cavitation of the fluid by insuring positive pressures on both sides of the dashpot piston. Heretofore this problem has been approached by the provision of a system of passages and check valves connecting a pressure reservoir to chambers on both sides of the piston.

The primary object of the present invention is to devise a shimmy damper having improved, reliable performance characteristics and which is simple in construction and maintenance.

A further object of the invention is to provide a shimmy damper which permits the same rate of flow through the dashpot piston orifices for equal loads in both directions.

Another object of the invention is to provide positive fluid pressure within the chambers on both sides of the dashpot piston by a pressure reservoir connected to one side only of one of said chambers.

A still further object of the invention is to utilize orifices in the dashpot piston and in the passage communicating with the pressure reservoir, having orifice approaches and exits so formed as to speed the flow in one direction and retard flow in the opposite direction for accomplishment of the other purposes hereof.

With the above and other objects in view this invention resides in the novel features of form, construction, arrangement, and combination of parts hereinafter described and pointed out in the claims.

The single figure of the accompanying drawing is a diagrammatic sectional view of a shimmy damper constructed in accordance with the present invention.

In the embodiment illustrated, a shimmy damper A includes a dashpot cylinder 11 having a longitudinal axis 12, an external attaching lug 13 at one end thereof aligned with said axis 12, and a rod opening 14 on said axis at the other end thereof. Mounted within a packing gland 15 in said rod opening 14 and adapted for reciprocation along the axis 12, is a piston rod 16 drilled at its outer end 17 for mounting thereof. At its inner end the piston rod 16 is secured to a dashpot 18 whose outer bearing surface 19 is adapted to reciprocate freely along the inner wall of the dashpot cylinder 11. The piston 18 divides the dashpot cylinder 11 into two chambers. The chamber on the side opposite the piston rod 16 is herein designated the inner chamber 20 (being the chamber which is reduced in size by an inward movement of said piston rod 16); and the chamber on the same side of said piston 18 as the piston rod 16, is designated the outer chamber 21 (that is, the chamber whose size is reduced by an outward movement of the piston rod 16).

The dashpot piston 18 is penetrated by one or more orifices 22 communicating between the inner chamber 20 and the outer chamber 21. The orifices 22 are of a type adapted to speed the flow of fluid from the inner chamber 20 and the outer chamber 21 and to retard flow in the opposite direction. On the side adjacent the inner chamber 20, in the embodiment illustrated, each of the orifices 22 is provided with a tapered or flared orifice approach 23, while on the other side of the outer chamber 21 each orifice 22 is provided with an exit which is simply cylindrical and normal to the surface of the piston 18. Other more complex types of orifice approaches and exits may be substituted that are well-known in the art. It will, of course, be recognized that the principal design criterion for such orifices will be that they provide flow capacity for damping oscillations under a pre-selected applied oscillating load. In the present invention, however, the orifices approaches and exits are so selected and combined as to serve two new purposes, (1) to compensate for the dimension of piston area on the side to which the piston rod is secured, and (2) to assure positive fluid pressures on both sides of the piston.

Thus, in the embodiment illustrated, the area of the outer face of the piston 18, being reduced by the presence of the rod 16, is approximately six per cent smaller than the area of the inner face thereof. A load applied outwardly will exert a unit pressure on the dashpot fluid approximately six per cent greater than that exerted by an equal load directed inwardly. In order to equalize the flow rate for equal oppositely applied loads, the configuration of the approaches 23 and exits 24 of the orifices 22 is such that the rate of flow from the outer chamber 21 to the inner chamber 20 will be retarded proportionately to compensate for the greater pressure on the outward stroke. In extreme cases it may be necessary to employ an exit of the Borda type to achieve a sufficient degree of restriction so that the desired characteristics may be attained.

One of the conditions requisite for proper operation of shimmy dampers of the fluid dashpot type is the maintenance of positive fluid pressure on both sides of the piston. There is provided in the present invention an auxiliary cylinder 25 cast integral with the dashpot cylinder 11 and parallel thereto, having at the outer end thereof a plunger rod opening 26, within which reciprocates and through which extends the plunger rod 27 of a disc-like plunger 28 having a seal 29 around the periphery for attaining a fluid-tight sliding engagement along the inner wall of said auxiliary cylinder 25. Opposed to the plunger 28 is a cylinder head 30, the varying space therebetween forming a fluid reservoir 31 which communicates with the inner chamber 20 of the dashpot cylinder 11 through a passage 32. The cylinder head 30 has two openings into said passage 32, the first being a reservoir orifice 33 having a flared or tapered orifice approach 34 on the side of the reservoir 31 into said passage 32. Considered as a unit with its approach 34 and exit 35, the reservoir orifice 33 is adapted to speed flow from the reservoir into the passage 32, retarding flow in the opposite direction. The second opening through head 30 into the passage 32 is a valved reservoir port 36 having on the side of passage 32 a check valve 37 equipped with a closing ball 38 and a light helical spring 39, such check valves being well-known in the art.

Disposed about the plunger rod 27 within the auxiliary cylinder 25 between the end thereof and the outer side of plunger 28, is a heavy helical compression spring 40, whose resistance determines the operating pressure of the dashpot fluid. Such fluid is introduced into the shimmy damper A through a conventional fitting (not shown) so as to completely fill the dashpot cylinder 11 when the piston rod 16 is drawn outwardly as far as possible, and also the passage 32 but only partially fill the reservoir 31.

In operation, the shimmy damper A is attached to the nosewheel of a tricycle aircraft in any suitable manner. For example, the attaching lug 13 may be pinned to the landing gear structure and the outer end 17 of the dashpot piston rod 16 may be pivotally connected to a lug on a ring which is rotatably mounted on the oleo strut and secured by a torque link to the landing leg. Such structure and mounting means are well-known.

Under oscillating loads the operation of the shimmy damper will be as follows:

Inasmuch as the plurality of dashpot piston orifices 22 have a substantially greater flow capacity than the reservoir orifice 33 on an inward stroke of the dashpot piston rod 16, pressure in the outer chamber 21 will be maintained at all times. This result is achieved not merely through the difference in orifice capacity, but also by reason of the fact that orifice approaches and exits are so arranged that on the inward stroke, flow will be facilitated through the piston orifices 22 and restricted through the reservoir orifice 33. The maintenance of positive pressure in the outer chamber 21 avoids cavitation of the dashpot fluid and the degree of looseness or "play" which otherwise exist under rapidly reversing loads.

By reason of the intrusion of the piston rod 16 into the outer chamber 21, its volume increase following an inward stroke is less than the volume decrease of the inner chamber 20. The excess of fluid is forced into the reservoir 31 through orifice 33. On the outward stroke, the inner chamber 20 will be filled primarily by flow from the outer chamber 21 back through the piston orifice 22 but in part from the reservoir 31. When the outward movement begins, the pressure in the inner chamber will be maintained by the action of the reservoir plunger 28. Flow through the reservoir orifice 33 into passage 32 is facilitated by the configuration of its approach 34. The opening of the check valve 37 also assures an adequate positive flow of fluid from the reservoir 31 into the passage 32 and inner chamber 20.

It is apparent that by the use of a single simple check valve and a passageway 32 communicating with the reservoir 31 to the inner chamber 20 of the shimmy damper A, positive pressure is at all times maintained on both sides of the dashpot piston 18 and a balance of flow characteristics under reversed loadings is achieved.

It should be understood that changes and modifications in the form, construction, arrangement, and combination of the several parts of the shimmy damper for steerable aircraft wheels may be made and substituted for those herein shown and described without departing from the nature and principle of this invention.

What I claim is:

1. A shimmy damper comprising a fluid filled dashpot cylinder, a piston in said cylinder for forming two chambers in said cylinder, a rod for said piston extending through one end of said cylinder, means for establishing communication between said chambers through said piston which includes ducts having flared openings at one end so that flow of fluid therethrough will be greater in one direction than the other, a reservoir cylinder disposed adjacent to said dashpot cylinder and in communication therewith, a piston in said reservoir cylinder, a spring in said reservoir cylinder for forcing fluid into said dashpot cylinder; and means for regulating the flow of fluid between said cylinders which concludes a wall structure having a check valve controlled duct and duct in the wall structure having a flared opening at one end so that the flow of fluid will be greater in one direction than the reverse direction.

2. A shimmy damper comprising, in combination, a tubular dashpot cylinder, a piston adapted for reciprocation therein, a piston rod mounted on one side of said piston and extending through the corresponding end of said cylinder, said end being otherwise closed to form an outer chamber, the other end of said cylinder being closed to form an inner chamber, said inner and outer chambers being separated by said piston, a flow orifice penetrating said piston and permitting fluid flow between said inner and outer chambers at a rate suitable for damping oscillations, the opening into said flow orifice from said inner chamber being taperingly enlarged to facilitate flow from said inner chamber to said outer chamber and the opening into said flow orifice from said outer chamber being adapted to retard reverse flow from said outer chamber to said inner chamber, a fluid reservoir adjacent said dashpot cylinder comprising a closed tubular cylinder, a spring-urged plunger mounted in said fluid reservoir for subjecting the fluid therein to pressure, a passage communicating between said reservoir and said inner chamber, and means for permitting ready flow from said reservoir into said passage and for retarding the flow from said passage into said reservoir.

3. The combination according to claim 2, wherein said last mentioned means includes a check valve and a flow orifice having a taperingly enlarged opening from said reservoir.

References Cited in the file of this patent

UNITED STATES PATENTS

| | | |
|---|---|---|
| 262,595 | Howatson | Aug. 15, 1882 |
| 2,393,110 | Kops et al. | Jan. 15, 1946 |

FOREIGN PATENTS

| | | |
|---|---|---|
| 395,410 | Great Britain | Jan. 13, 1933 |
| 371,076 | France | Jan. 11, 1907 |